Dec. 11, 1945.   M. P. HOLMES   2,390,589
TWO-SPEED DRIVE MECHANISM
Filed Jan. 4, 1944   2 Sheets-Sheet 1

Inventor
Morris P. Holmes
by Wright, Brown, Quinby & May
Attys.

Dec. 11, 1945.  M. P. HOLMES  2,390,589
TWO-SPEED DRIVE MECHANISM
Filed Jan. 4, 1944  2 Sheets-Sheet 2
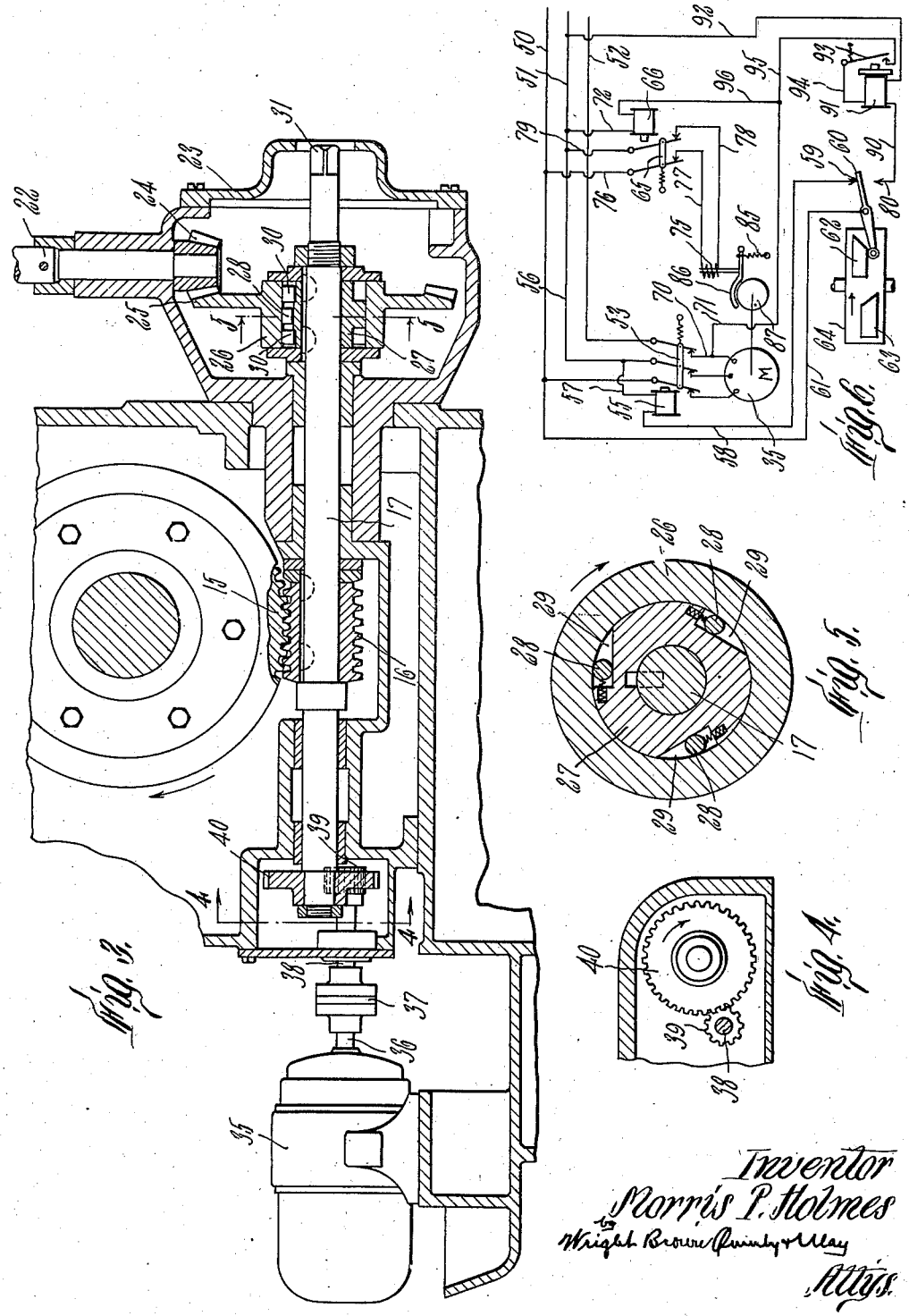
Inventor
Morris P. Holmes
by Wright Brown Quinby & May
Attys.

Patented Dec. 11, 1945

2,390,589

UNITED STATES PATENT OFFICE 2,390,589

TWO-SPEED DRIVE MECHANISM

Morris P. Holmes, Claremont, N. H., assignor to Jones & Lamson Machine Company, Springfield, Vt., a corporation of Vermont Application January 4, 1944, Serial No. 516,986

2 Claims. (Cl. 192—144)

This invention relates to a two-speed drive mechanism of a type particularly suitable for application to machine tools such as lathes, or the like. In such machines it is desirable that the cutting portions of the tool strokes be made at relatively low speeds, but in order to save time the inactive tool motions, such as retracting or moving from fully retracted positions to positions near to the work, are made at high speeds. In a lathe of the well known "Fay" type, for example, the tool motions are produced by the actions of cams carried by drums on a cam shaft, the shaft being driven at either a relatively low working speed or at a relatively high idle speed.

In accordance with the present invention the high speed drive is provided by a motor which, when de-energized, is driven at a low idle speed when the low speed is in operation so that it is ready at once as soon as energized to take over the drive at the high speed, over-running the low speed drive. Means are also provided to apply a brake as soon as the high speed drive motor is de-energized so that the driven parts quickly slow to the speed produced by the low speed drive, the brake being then released so as to place no load on the low speed drive mechanism. With this arrangement, should the power for the entire machine fail during operation of the machine, the brake is applied and the machine is stopped, avoiding the possibility of damage resulting from coasting of the cam drum. Any possibility of the tools contacting the work while the machine is under high speed is thus avoided.

For a more complete understanding of this invention, together with further objects and advantages, reference may be had to the accompanying drawings in which Figure 1 is a fragmentary rear elevation of a Fay lathe embodying the invention.

Figure 3 is a detail sectional view on line 3—3 of Figure 1.

Figures 4 and 5 are detail sectional views on lines 4—4 and 5—5, respectively, of Figure 3.

Figure 6 is a wiring diagram of the fast speed motor circuit.

For illustration, but not by way of limitation, the invention is shown as applied to a "Fay" lathe of the type shown in Letters Patent to Lovely No. 1,923,493 granted August 22, 1933, for Lathe.

Figure 2:
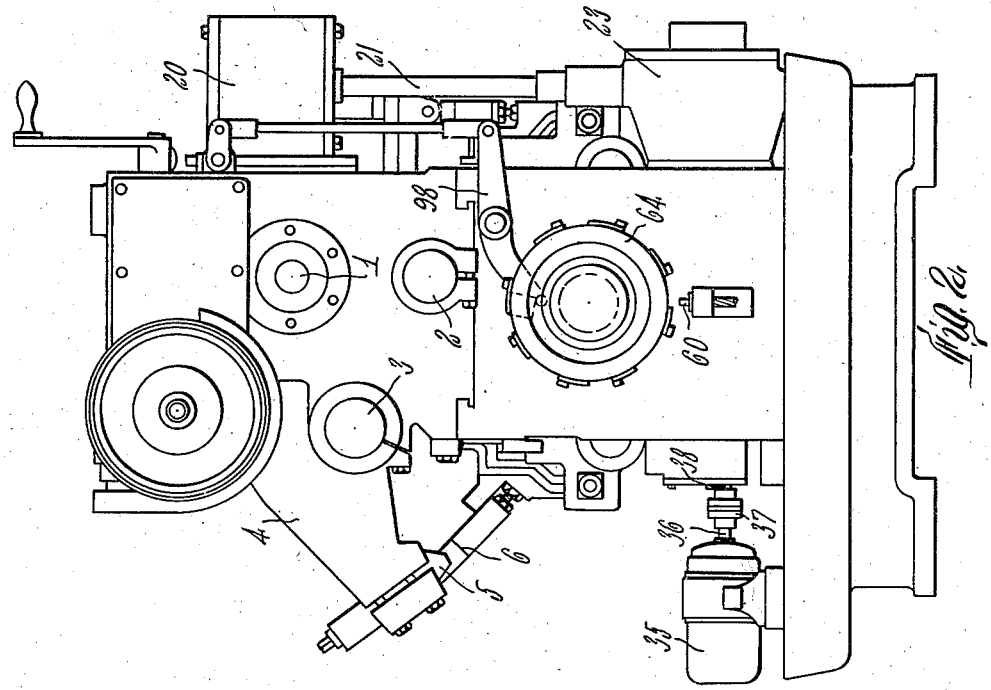
Figure 2 is a left end elevation of the machine.
Figure 1:
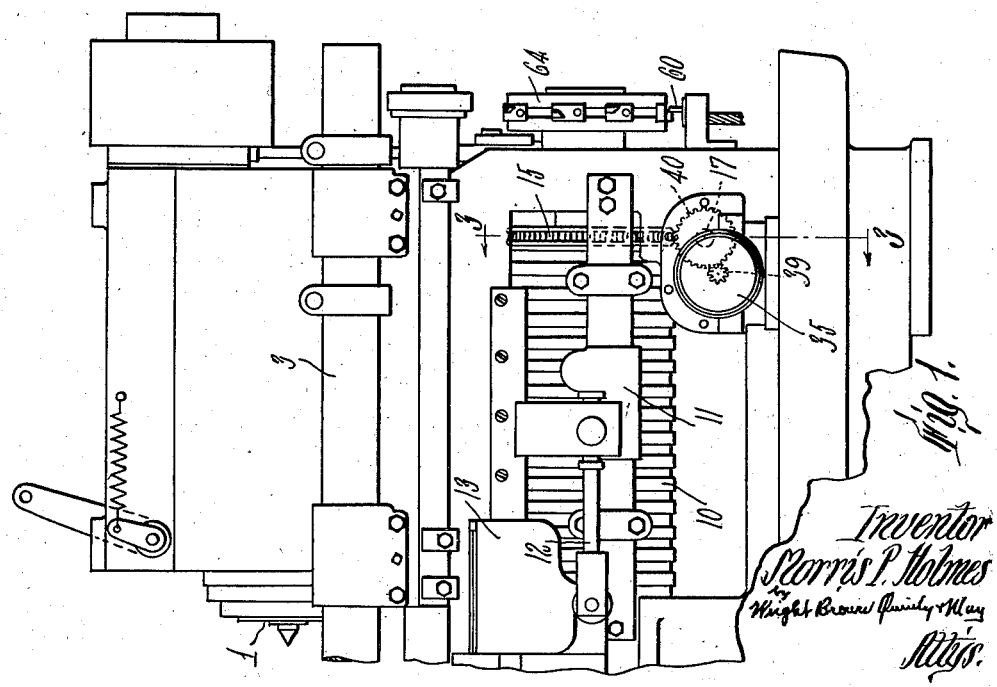

Some of the lathe structure is shown in Figures 1 and 2 which illustrate the headstock end of the machine. The headstock spindle which carries at its inner end a work-holding chuck is indicated at 1 in the upper portion of the machine. As fully shown and described in the Lovely patent, the tools are carried by rockably and sometimes axially movable bars 2 and 3. Each of these bars has secured thereto tool arms, such as the tool arm 4 shown in Figure 2 as carried by the rear tool bar 3, and the rear end of this arm is provided with a cam follower 5 for engagement with a former cam 6. The former cam 6 is arranged to be moved lengthwise of the machine in order to control the angular position of the arm 4 and this is accomplished by the action of cams (not shown) which may be secured to a rotary cam drum 10 beneath the machine. Such cams may produce traversing motion to a carriage 11 connected by a link 12 to a former cam slide 13. Similarly, a tool arm (not shown) carried by the front tool bar 2 may be controlled by other cams on the cam drum 10, all as more completely shown in the Lovely patent to which reference has been made.

The cam drum is rotated at either of two speeds, a relatively low working speed and a rapid idle speed. For this purpose the drum shaft has fixed thereto a worm wheel 15 with which meshes a worm 16 (see Figure 3) carried by a transverse worm shaft 17 journaled beneath the cam drum 10. As shown in the Lovely patent, the low speed drive for the cam drum is derived from the rotation of the spindle 1. Suitable gearing transmitting rotation therefrom is housed within a gear box 20 (see Figure 2) from which there extends downwardly within a tubular casing 21, a vertical shaft 22 (Figure 3). At the lower end of the shaft 22 and within a casing 23 it carries a beveled pinion 24 which meshes with a bevel gear 25 journaled on the worm shaft 17 and connected thereto through an over-running clutch shown best in Figure 5. Thus the hub 26 of the bevel gear surrounds a sleeve 27 keyed to the worm shaft 17, roller clutch elements 28 riding in the pockets 29 in the sleeve 27 serving to connect the hub of the gear 25 to rotate the cam shaft 17 by rotation in driving direction of the gear 25, while permitting the cam shaft 17 to be rotated at a faster rate in the same direction. On opposite sides of the over-running clutch, the gear hub 26 may have interposed between it and the sleeve 27 antifriction bearings as at 30. The adjacent end of the worm shaft 17 may be squared off as at 31 for the reception of a wrench by which it may be turned by hand when desired as in setting up the machine.

The high speed drive for the cam drum is produced by a motor 35 and as shown it is of the uni-brake type having built into its casing an electrically released spring-applied brake for the motor shaft. Commonly such a brake is connected up in the motor circuit so that when the motor is energized the brake release mechanism is also energized, but when the motor is de-energized the release mechanism is also de-energized and the spring is free to apply the brake to quickly slow the rotation of the motor. For the present purpose a special brake release circuit is employed as will later appear.

As shown the armature shaft 36 is connected through a coupling 37 to a pinion shaft 38 having thereon a pinion 39 meshing with a gear 40 keyed to the opposite end of the worm shaft 17 from the over-running clutch. With this connection it will be seen that the motor 35 is always connected to the shaft 17 so that when the motor is energized it drives the shaft 17 and when it is de-energized it is driven idly by the shaft 17 when this shaft is rotated by the low speed drive mechanism. With this arrangement the motor is turning when the low speed drive is in operation so that the moment it is energized, it starts from the speed which would drive the worm shaft at its low speed rate and immediately picks up load, increasing the speed of rotation of the worm shaft 17 until it reaches its normal high speed rate. It is important, however, that when the high speed drive is not desired, the speed of the worm shaft be reduced rapidly to that of the low speed drive when the machine is in operation, in order that tools which may have rapidly approached the work shall not continue their rapid progress at the time they actually contact the work, which should be at the low working speed.

The brake of the uni-brake motor is therefore so connected in, in accordance with this invention that as soon as the motor is de-energized, the brake is immediately applied, thus to overcome the momentum of the motor and the other parts which are turning at the high speed rate and reduce the speed to the low speed rate, but as soon as this slowing down has been accomplished, it is highly desirable that the braking effect shall be stopped in order not to impart a heavy drag to the low speed drive mechanism. For this purpose, the brake mechanism is connected in in accordance with the diagram of Figure 6. Referring to this figure, the motor is shown of the three-phase type, receiving its energization from the lines 50, 51 and 52 through a normally open main controlling switch 53. This switch is closed by the energization of a switch-closing solenoid 55 which receives its energy from the line 51 through leads 56 and 57, coil 55, lead 58, switch contact 59 and switch arm 60, lead 61, back to the line 50. The switch arm 60 is controlled by suitable cams such as 62 and 63 on a cam drum 64 fixed to the cam shaft which carries the drum 10. In the position shown in Figure 6, the switch arm 60 is in closed position with the high speed motor 35 energized. At the same time a normally open brake-releasing switch 65 is closed and held closed by the solenoid 66 which receives its energy from the line 52 through the main switch 53, leads 70 and 71, solenoid 66 and lead 72 to the line 51. This closes the switch 65, energizing the brake-release solenoid 75 which receives energy from the line 50 through the lead 76, switch 65, lead 77, solenoid 75, lead 78, switch 65 and lead 79 to the line 51.

As the cam shaft rotates at the high speed, the cam 63 contacts the switch arm 60 and rocks it to break the circuit at the contact 59 and to close the circuit at the contact 80. The breaking of the circuit at the contact 59 de-energizes the motor switch solenoid 55 and allows the main switch 53 to open, and also interrupts the circuit through the brake release solenoid 66 from the switch 53 to the lead 70. The brake spring 85 then applies the brake 86 to the brake drum 87 on the motor shaft, thus slowing down the rotation of the motor 35 rapidly. The closing of the contact at 80 establishes a circuit from the line 50, lead 61, switch 60, contact 80, lead 90, time delay relay 91, lead 92 to the line 51 so that when the time for which the relay has been set has elapsed, during which the brake is applied to the motor shaft, the normally open switch 93 is closed, this establishing a circuit from the line 50, lead 61, switch arm 60, contact 80, lead 90, time delay relay, lead 94, switch 93, leads 95 and 96, brake-release coil 66, lead 72 to line 51. Thus the switch at 65 is then closed, energizing the brake-release solenoid 75 and thus releasing the brake. This time delay is so arranged that by the time the rotation of the cam drum has been slowed down to its slow working speed, the brake is released so that the rotation of the cam drum proceeds, as driven by the low speed drive mechanism free from any drag imposed by the brake mechanism.

Should the power fail during operation of the machine, the brake-release solenoid is immediately de-energized and the brake is applied and so remains, stopping the machine.

The cam drum 64 which carries the cams for controlling the electric circuit to the high speed drive motor, is also provided with the stop cam which acts on the lever 98 to stop the machine at the end of its cycle of operations, as fully described in the Lovely patent to which reference has been made.

From the foregoing description of an embodiment of this invention, it should be evident to those skilled in the art that various changes and modifications might be made without departing from the spirit or scope of this invention.

I claim:

1. In combination, a driven member, a low speed drive mechanism connected to drive said driven member, an over-running clutch in such connection, a motor connected to drive said member at a relatively high rate of speed, a spring applied electrically-released brake mechanism for said driven member, said electrically released mechanism being energized by said motor circuit to hold said brake released when said motor is energized and to permit the spring to apply the brake when said motor is de-energized, and a time delay mechanism for again energizing said brake release mechanism to release said brake a predetermined time after the deenergization of said motor.

2. In combination, a driven member, a low speed drive mechanism connected to drive said driven member, an over-running clutch in such connection, a motor connected to drive said member at a relatively high rate of speed and to be driven idly by said low speed drive mechanism when said motor is de-energized, a spring-applied electrically-released brake mechanism for said driven member, said electrically released mechanism being energized by said motor circuit to hold said brake released when said motor is energized and to permit the spring to apply the brake when said motor is de-energized, and a time delay mechanism for again energizing said electrically released mechanism to release said brake a predetermined time after the de-energization of said motor when the speed of rotation of said motor has been reduced to substantially that of its rotation when driven by said low speed drive mechanism.

MORRIS P. HOLMES.